US00RE43273E

(19) United States
(12) Reissued Patent
Aarts et al.

(10) Patent Number: US RE43,273 E
(45) Date of Reissued Patent: Mar. 27, 2012

(54) GENERATION OF A SOUND SIGNAL

(75) Inventors: Ronaldus Maria Aarts, Geldrop (NL); Roy Irwan, The Hague (NL); Daniel Willem Elisabeth Schobben, Waalre (NL)

(73) Assignee: Koninklijke Philips Electronics N.V., Eindhoven (NL)

(21) Appl. No.: 12/725,693

(22) Filed: Mar. 17, 2010

Related U.S. Patent Documents

Reissue of:

(64) Patent No.: 7,489,792
Issued: Feb. 10, 2009
Appl. No.: 10/528,489
PCT Filed: Sep. 16, 2003
PCT No.: PCT/IB03/04002
§ 371 (c)(1),
(2), (4) Date: Mar. 18, 2005
PCT Pub. No.: WO2004/028204
PCT Pub. Date: Apr. 1, 2004

(30) Foreign Application Priority Data

Sep. 23, 2003 (EP) ..... 02078943

(51) Int. Cl.
*H04R 5/02* (2006.01)

(52) U.S. Cl. ..... 381/309; 700/94

(58) Field of Classification Search ..... 381/17–24, 381/309, 310, 1, 61, 92, 26, 108; 700/94
See application file for complete search history.

(56) References Cited

U.S. PATENT DOCUMENTS

| | | | | |
|---|---|---|---|---|
| 5,572,591 | A * | 11/1996 | Numazu et al. | 381/1 |
| 5,742,689 | A * | 4/1998 | Tucker et al. | 381/17 |
| 6,496,584 | B2 | 12/2002 | Irwan et al. | |
| 6,829,361 | B2 * | 12/2004 | Aarts | 381/309 |
| 6,990,205 | B1 * | 1/2006 | Chen | 381/17 |
| 7,110,556 | B2 * | 9/2006 | Aarts et al. | 381/98 |
| 7,489,792 | B2 * | 2/2009 | Aarts et al. | 381/309 |

FOREIGN PATENT DOCUMENTS

| | | | |
|---|---|---|---|
| EP | 0107757 | A1 | 8/1983 |
| WO | WO 01/49066 | A2 | 7/2001 |
| WO | WO 01490073 | A2 | 7/2001 |

* cited by examiner

*Primary Examiner* — Davetta W Goins
*Assistant Examiner* — Lun-See Lao

(57) ABSTRACT

In a method and a media system of/for generation of at least one output signal ($H_{PL}$,$H_{PR}$) from at least one input signal belonging to a second set of sound signals (M) having a related second set of Head Related Transfer Functions, in which the media system can be a TV, a CD player, a DVD player, a Radio, a display, an amplifier, a headphone or a VCR, the method includes the steps of determining, for each signal in the second set of sound signals, a weighted relation (14) including at least one signal belonging to a third set of intermediate sound signals (CHI1, CHI2) and at least one weight value (Weights); determining a first set of Head Related Transfer Functions (HRTFs) based on the second set of sound signals, the second set of Head Related Transfer Functions and the weighted relation; and transferring at least one signal belonging to the third set of intermediate sound signals by means of at least one HRTF belonging to said first set of Head Related Transfer Functions in order to generate at least one output signal belonging to said first set of sound signals. Hereby, in the end, fewer HRTFs are determined for a subsequent transfer of input signal(s) to output signal(s). Accordingly, few convolutions are required.

12 Claims, 3 Drawing Sheets

GENERATION OF A SOUND SIGNAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to, in a media system, a method of generating at least one output signal from at least one input signal from a second set of sound signals having a related second set of Head Related Transfer Functions.

The present invention also relates to a computer system for performing the method.

The present invention further relates to a computer program product for performing the method.

This invention further relates to a media system for generating at least one output signal from a first set of sound signals from at least one input signal from a second set of sound signals having a related second set of Head Related Transfer Functions.

2. Description of the Related Art

International Patent Application No. WO 01/49073, corresponding to U.S. Pat. No. 7,110,556, discloses a sound reproduction system simulating external sound sources. The system uses a number of so-called Head Related Transfer Functions, HRTFs, to generate sound for a set of headphones.

It is generally known in prior art literature that input channels of sound sources which are to be combined into outputs, i.e., resulting sound signals, will require a relatively high number of HRTFs. This typically leads to system implementations with said HRTFs, which are quite expensive, require unnecessary convolutions and are complex to design. This will be discussed further by means of FIGS. 1 and 2, where prior art applications and the invention with corresponding formulas and numbers of HRTFs are shown by means of calculation.

SUMMARY OF THE INVENTION

The above problems are solved by said method, the method comprising the steps of:

determining, for each signal in the second set of sound signals, a weighted relation comprising at least one signal from a third set of intermediate sound signals and at least one weight value;

determining a first set of Head Related Transfer Functions based on the second set of sound signals, the second set of Head Related Transfer Functions and the weighted relation; and transferring at least one signal belonging to the third set of intermediate sound signals by means of at least one HRTF belonging to said first set of Head Related Transfer Functions in order to generate at least one output signal belonging to said first set of sound signals.

In the first step, for each signal in the second set of sound signals, i.e., for each signal in a number of input sound signals, a weighted relation comprised by intermediate sound signals and at least one weight value is determined. Hereby said input sound signals are converted to intermediate sound signals for a subsequent internally use.

In the second step, said first, but new set of HRTFs is then determined based on the second set of sound signals, typically input sound signals and said second set of Head Related Transfer Functions, related to said input sound signals and initially dedicated to transform or transfer said second set of input sound signals.

It is an advantage that in said determination—which will be discussed in the embodiments according to the invention—the new set of HRTFs comprises fewer HRTFs than said second set of Head Related Transfer Functions originally dedicated to transfer the input sound signals.

Subsequently, in the third step, said new, but fewer HRTFs (i.e., first set of Head Related Transfer Functions) are used to generate one or more output signal (belonging to said first set of sound signals) since one or more signals belonging to the third set of intermediate sound signals is transferred by means of said new, lower number of HRTFs in order to obtain said output signals.

Said problems are further solved by said media system on which said method can be executed. The media system may be a TV, a CD player, a DVD player, a Radio, a display with sound, an amplifier, a headphone or a VCR.

In a preferred embodiment, said media system comprising:

means for determining for each signal in the second set of sound signals, a weighted relation comprising at least one signal belonging to a third set of intermediate sound signals and at least one weight value;

means for determining a first set of Head Related Transfer Functions based on the second set of sound signals, the second set of Head Related Transfer Functions and the weighted relation; and means for transferring at least one signal belonging to the third set of intermediate sound signals by means of at least one HRTF belonging to said first set of Head Related Transfer Functions in order to generate at least one output signal belonging to said first set of sound signals.

The media system gives the same advantages for the same reasons as described previously in relation to the method.

BRIEF DESCRIPTION OF THE DRAWINGS

The prior art and the invention will be explained more fully below in connection with preferred embodiments and with reference to the drawings, in which.

Throughout the drawings, the same reference numerals and like names indicate similar or corresponding features, functions, etc.

DESCRIPTION OF THE PREFERRED EMBODIMENTS

Figure 1:
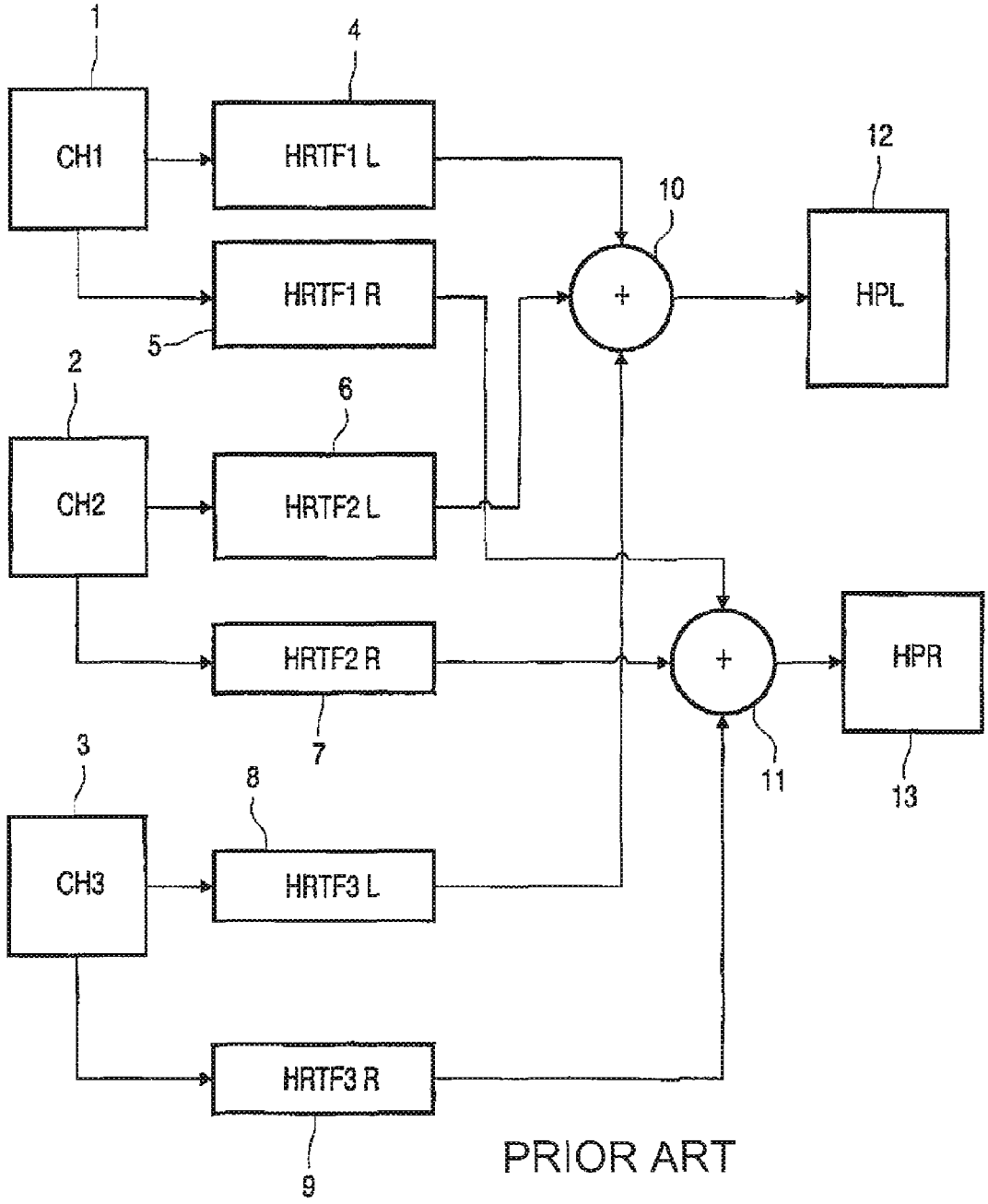
FIG. 1 shows examples of the generation of two output sound signals from three input sound signals in the prior art and according to the invention.

In the present invention a set of head related transfer functions (HRTFs) may be used to generate one or more sound signals. The HRTFs may be defined as functions describing how sound propagates from a specific sound source to the ear and the number of HRTFs belonging to a set, this could be from one HRTF describing sound propagation from a source to the two ears and to a number of HRTFs depending on the number of sources delivering sound. Alternatively, from few (n) inputs signals, m intermediate signals are derived which needs 2 times m HRTFs (m>n) head related transfer functions (HRTFs) may be used to expand said input signals (as the source) into multi-channel sound (as an intermedia product), which then may be down-mixed to fewer resulting output sound signals, e.g., a Left and a Right signal for a headphone.

A description of HRTF can further be found in the following journal: H. Moller, "Fundamentals of binaural technology", Applied Acoustics, Special issue on auditory environment and telepresence, Vol. 36, No. 3-4, pp. 171-218, (1992).

In the following HRTF is defined in further detail. By finding the sound pressure that an arbitrary source produces at the eardrum (taking into consideration parameters, such as the distance between the ears and the shape of the outer ear), all that is needed is the impulse response from the source to the eardrum, which can be measured, e.g., by placing a microphone in the ear. This is called the Head-Related Impulse Response, and its Fourier transform is called the Head Related Transfer Function (HRTF). The HRTF captures all of the physical cues to source localization. Once the HRTF for the left ear and the right ear are known, it is possible to synthesize accurate binaural signals from a monaural source. The head related transfer function is well known and is described in a number of documents, such as Blauert, Spatial hearing: The Psychophysics of Human Sound Localization (MIT Press, Cambridge, Mass., 1983). When sound is filtered by a set of HRTFs, the sound is optimized for the person to which the set of HRTFs belongs and, therefore, the sound experience is never optimal for anyone but the person to which the set of HRTFs belongs. The set of HRTFs are filter functions with parameters or coefficients being specific for specific persons. For a specific person, different sets of HRTFs can be obtained depending on the arbitrary source mentioned above, the distance between the source and the person and also on the characteristics of the room in which the function parameters are measured. When, e.g., the source is headphones, the HRTFs depend on the headphone through which sound reproduction takes place. The result of filtering sound using this function is that an optimal spatial reproduction of surround sound in headphones is obtained. The source could also be a typical loudspeaker; in this case, it is necessary to perform cross-talk cancellation, which, e.g., can be based on the HRTF.

Stereophonic sound signals comprise a left and a right signal component which may originate from a stereo signal source, for example from a set of microphones, e.g., via further electronic equipment, such as a mixing equipment, etc. The signals may further be received as an output from another stereo player, over-the-air as a radio signal, or by any other suitable means.

FIG. 1 shows examples of the generation of two output sound signals from three input sound signals in the prior art and according to the invention. Said two sound signals may, in a typical use, comprise a stereophonic signal distributed to two speakers in a headphone.

Firstly, according to the prior art, it is well known to reproduce multi-channel sound via headphones. This multi-channel sound reproduction through a headphone makes use of the known techniques called binaural and Head Related Transfer Function (HRTF). The term "binaural" refers to the fact that there are two inputs to the listener's ears (left and right). Any set of left and right channel signals that are recorded at the position of the eardrum are called binaural signals.

It is the intention to have the same sound at the eardrum when using a headphone as when loudspeakers are playing. In order to achieve this, more knowledge must be gathered about the transmissions of the sound source into the eardrum. This transmission is best described in terms of Head Related Transfer Functions (HRTF) that include any linear filtering, such as coloration and inter-aural time and spectral differences. Inter-aural time differences occur because a sound wave travels at two different distances to left and right ear. These transfer functions depend on the angle of incidence and distance to the sound source.

Reverting back to the figure, reference numerals 1, 2 and 3 indicate the corresponding three channels (i.e., three input sound signals) $CH_1$, $CH_2$ and $CH_3$ combined into a left, $H_{PL}$ and a right $H_{PR}$ resulting (output) sound signal for the headphone. Said channels are each transmitted by means of three related Head Related Transfer Functions, reference numerals 4 through 9. In other words, $CH_1$, is transmitted by means of the Head Related Transfer Function $HRTF_1$, correspondingly $CH_2$, is transmitted by means of the Head Related Transfer Function $HRTF_2$, etc. This is performed for both channels in order to achieve—by summation of products of channels and related HRTFs, reference numerals 10 and 11—that the stereophonic signals are generated. Said stereophonic (output) signals are indicated by left, $H_{PL}$ reference numeral 12, and right, $H_{PR}$ reference numeral 13, as the two resulting sound signals.

The summation for the left resulting sound signal is then:

$$H_{PL}=CH_1\cdot HRTF_{1,L}+CH_2\cdot HRTF_{2,L}+CH_3\cdot HRTF_{3,L} \quad (1)$$

Correspondingly, summation for the right resulting sound signal will then be:

$$H_{PR}=CH_1\cdot HRTF_{1,R}+CH_2\cdot HRTF_{2,R}+CH_3\cdot HRTF_{3,R} \quad (2)$$

Thus in the prior art case, this transmission will require two times three, i.e., six Head Related Transfer Functions.

Generally throughout the application, the notation "·" denotes a product if the above-mentioned variables are in the frequency domain; whereas in the time domain, "·" denotes a convolution of the variables.

Generally and correspondingly, when expanding the prior art example, n=3 (input) channels of sound sources ($CH_1$ to $CH_3$) to be combined into m sound outputs, i.e., m resulting sound signals, will require n times m Head Related Transfer Functions.

Secondly, according to a preferred embodiment of the invention, the same transmission—as the prior art example—may be implemented in a different way. In order to continue the example, the same three channels ($CH_1$, $CH_2$, and $CH_3$) will be discussed. It is that these may be linear combinations or a weighted version of the left and right (intermediate) channel with the weights α and β. Said α and β may have their weight values depending on each channel, i.e., L and R, thus in general:

$$CHi=\alpha_i\cdot L+\beta_i\cdot R. \quad (3)$$

Someone skilled in the art may—when applying the invention for more than two channels (L, R), e.g., for a third, a fourth channel, etc, i.e., C, D, etc.,—subsequently generalize formula (3) into:

$CHi=\alpha_i\cdot L+\beta_i\cdot R+c_i\cdot C+d_i\cdot D$, etc., for a corresponding higher number of resulting (output) sound signals ($H_{PL}$, $H_{PR}$, $H_{PC}$, $H_{PD}$, etc.) for corresponding speakers or end result sounds.

In the Sound Engineering Society Conference Paper, presented at the 19th International Conference 2001 Jun. 21-24 Schloss Elmau, Germany by Roy Irwan and Ronald M. Aarts, Philips Research Laboratories, a method to convert stereo to multi-channel sound is disclosed. In this paper—on page 3—said α and β's are defined using a corresponding $W_L(k)$ and $W_R(k)$ (weight) notation—at the time instant k—for the left and right channel, respectively.

For the sake of conciseness, two channels (of resulting (output) sound signals) will only be used in this example.

Continuing the prior art example of FIG. 1, but implemented in a preferred first embodiment of the invention according to the following:

$$CH_1=\alpha_1\cdot L+\beta_1\cdot R \tag{4}$$

$$CH_2=\alpha_2\cdot L+\beta_2\cdot R \tag{5}$$

$$CH_3=\alpha_3\cdot L+\beta_3\cdot R \tag{6}$$

It is found that formula (1) and (2) may still be applied for the summation (of products of channels and related HRTFs), thus when (4) (5) and (6) are inserted in (1) and (2), it gives:

$$H_{PL}=(\alpha_1\cdot L+\beta_1\cdot R)\cdot HRTF_{1,L}+(\alpha_2\cdot L+\beta_2\cdot R)\cdot HRTF_{2,L}+(\alpha_3\cdot L+\beta_3\cdot R)\cdot HRTF_{3,L} \tag{7}$$

$$H_{PR}=(\alpha_1\cdot L+\beta_1\cdot R)\cdot HRTF_{1,R}+(\alpha_2\cdot L+\beta_2\cdot R)\cdot HRTF_{2,R}+(\alpha_3\cdot L+\beta_3\cdot R)\cdot HRTF_{3,R} \tag{8}$$

Or expressed differently:

$$H_{PL}=L\cdot(\alpha_1\cdot HRTF_{1,L}+\alpha_2\cdot HRTF_{2,L}+\alpha_3\cdot HRTF_{3,L})+R\cdot(\beta_1\cdot HRTF_{1,L}+\beta_2\cdot HRTF_{2,L}+\beta_3\cdot HRTF_{3,L}); \tag{9}$$

Accordingly, $$H_{PR}=L\cdot(\alpha_1\cdot HRTF_{1,R}+\alpha_2\cdot HRTF_{2,R}+\alpha_3\cdot HRTF_{3,R})+R\cdot(\beta_1\cdot HRTF_{1,R}+\beta_2\cdot HRTF_{2,R}+\beta_3\cdot HRTF_{3,R}). \tag{10}$$

However, note—the HRTFs discussed so far in respect of the invention—are merely used as intermediate variables in the formulas—and are not and need not as opposed to the discussion relating to said prior art, be implemented as real Head Related Transfer Functions.

Or for i=3, i.e., in a generalized form:

$$H_{PL} = L\cdot\sum_i(\alpha_i\cdot HRTF_{i,L}) + R\cdot\sum_i(\beta_i\cdot HRTF_{i,L}) \tag{11}$$

$$H_{PR} = L\cdot\sum_i(\alpha_i\cdot HRTF_{i,R}) + R\cdot\sum_i(\beta_i\cdot HRTF_{i,R}) \tag{12}$$

Thus there are only two filters for the Left headphone driver, $H_{PL}$ needed in order to filter the Left and Right signals respectively, since the factors in formula (11)$\cdot(\alpha_i\cdot HRTF_{i,L})$, $\cdot(\beta_i\cdot HRTF_{i,L})$ are considered each as one filter.

Correspondingly, with regard to formula 12, $\cdot(\alpha_i\cdot HRTF_{i,R})$ and $\cdot(\beta_i\cdot HRTF_{i,R})$ are the two filters for the Right headphone driver, $H_{PR}$.

Thus only two filters are needed to filter the Left and Right signals for the Right headphone driver.

Thus—when continuing the implementation according to the invention with three input sound channels—the transmission will now only require two times two, i.e., four Head Related Transfer Functions. Compared to the prior art example of FIG. 1—where six Head Related Transfer Functions were required—the invention will require fewer Head Related Transfer Functions for the same transmission.

Correspondingly, fewer convolutions will be required for the same transmission.

In other words, when the example is further generalized—starting with and according to the prior art—in a simple cascading of sound signals, e.g., with m=2 (i.e., stereo, two output channels or signals, e.g., for two headphone drivers), n=5 input channels or sound signals ($CH_1$ to $CH_5$) will require a total of 2 times 5 that is 10 HRTF (in the prior art), but only four Head Related Transfer Functions for a similar transmission are still required according to the invention's first embodiment.

Figure 2:
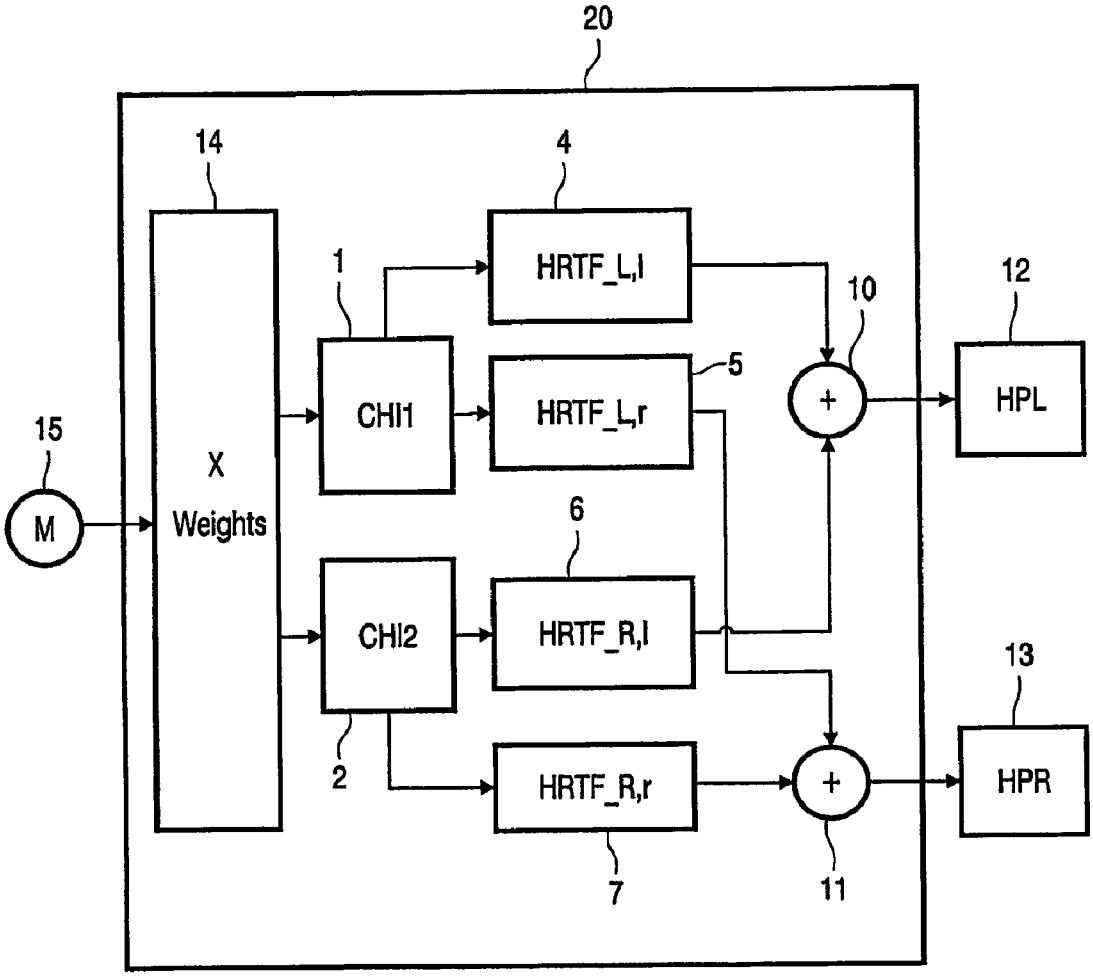
FIG. 2 shows the generation of two output sound signals from one input sound signal.

FIG. 2 shows the generation of two output sound signals from one input sound signal. Said two sound signals may in a typical use again comprise a stereophonic signal distributed to two speakers in a headphone, however in this example—as a second embodiment of the invention—only one source, M of an input sound signal is discussed.

Firstly, the prior art will be discussed with a calculation of HRTF's used:

The prior art is applied for only one input channel (as in this figure), i.e., an input sound source M and then distributed to two resulting (output) sound signals $H_{PL}$, $H_{PR}$. Compared to and according to FIG. 1, in principle one channel (i.e., $CH_3$) less is used; correspondingly, the summation for the left resulting (output) sound signal in the prior art is:

$$H_{PL}=CH_1\cdot HRTF_L,l+CH_2\cdot HRTF_R,l \tag{13}$$

And, correspondingly, summation for the right resulting (output) sound signal will then be:

$$HPR=CH_1\cdot HRTF_L,r+CH_2\cdot HRTF_R,r \tag{14}$$

Here the first uppercase notation is each of the loudspeaker channels, L and R, respectively, and the second lower case notation is l for the left ear, r for the right ear.

Thus in this prior art case, this transmission will require two times two, i.e., four Head Related Transfer Functions.

Secondly, the second embodiment, i.e., FIG. 2, according to the invention will be discussed:

Imagine a (moving) singer "M" in a studio is recorded onto a CD with two output sound channels, $H_{PL}$ and $H_{PR}$.

By using Principle Component Analysis, the necessary alpha's, $\alpha_i$'s (as shown below in the formulas (15)) may be recovered. Hence two channels are used to locate the singer on the line between the loudspeakers. It may be the case that that the alpha's are time variant.

A general discussion on Principle Component Analysis can be found in Principal Component Analysis by S. Haykin, Neural Networks, Prentice-Hall, N.J., 1999, Second Edition which is used in the previously mentioned article: "A method to convert stereo to multi-channel."

The single sound (input) source, M may be anywhere between two loudspeakers. E.g., in a studio there is a singer M, pan-potted between both (or even more channels) so the left intermediate channel (CHI1) which may be expressed as $\alpha_{i1}\cdot M$ and the right intermediate channel (CHI2) may be expressed as $\alpha_{i2}\cdot M$, thus:

$$CHI_1=\alpha_{i1}\cdot M \text{ and } CHI_2=\alpha_{i2}\cdot M \tag{15}$$

However, note—said channels ($CHI_1$, $CHI_2$) in respect of the invention for this particular embodiment—are merely used as intermediate channels (variables) in the formulas—and are not real channels as opposed to the discussion (i.e. $CH_1$, $CH_2$) relating to the prior art.

In other words, in respect of the invention, left and right (intermediate channels) are mapped onto one channel M.

So equation 13 and 14 can—switching from the prior art to another embodiment of the invention according to FIG. 2—be expressed as:

$$H_{PL}=\alpha_{i1}\cdot M\cdot HRTF_L,l+\alpha_{i2}\cdot M\cdot HRTF_R,l \tag{16}$$

$$HPR=\alpha_{i1}\cdot M\cdot HRTF_L,r+\alpha_{i2}\cdot M\cdot HRTF_R,r \tag{17}$$

or $$H_{PL}=M\cdot(\alpha_{i1}\cdot HRTF_L,l+\alpha_{i2}\cdot HRTF_R,l) \tag{18}$$

$$HPR=M\cdot(\alpha_{i1}\cdot HRTF_L,r+\alpha_{i2}\cdot HRTF_R,r) \tag{19}$$

or $$H_{PL}=M\cdot H_1 \quad (20)$$

$$H_{PR}=M\cdot H_2 \quad (21)$$

$$\text{where } H_1=(\alpha_{i1}\cdot HRTF_L,l+\alpha_{i2}\cdot HRTF_R,l) \quad (22)$$

$$\text{and } H_2=(\alpha_{i1}\cdot HRTF_L,r+\alpha_{i2}\cdot HRTF_R,r) \quad (23)$$

This shows that the invention needs only two convolutions or HRTFs, since the factors (H_1, H_2) in formula 20 and 21, respectively, are considered each as one HRTF filter.

Thus the transmission will now only require two Head Related Transfer Functions. Compared to the prior art—where four Head Related Transfer Functions were required—the invention will require fewer Head Related Transfer Functions (and correspondingly convolutions) for the same transmission from one (input) sound source, M.

However, said second embodiment of mapping only two output channels onto one channel is very simple, the second embodiment may be generalized to mapping of more than two channels onto one (with corresponding α's) as discussed in:

International Patent Application No. WO02/07481: Multi-channel stereo converter for deriving a stereo surround and/or audio centre signal, Koninklijke Philips Electronics N.V. Inventor(s): Irwan, Roy; AARTS, Ronaldus, M., (European Patent Application No. EP1295511, Filed 20010705, A2. Published 20020124) where two channels (L,R) are mapped onto one C, or centre channel, using Principle Component Analysis; and C. Faller and F. Baumgartner, "Binaural cue coding applied to stereo and multi-channel audio compression", Convention paper 5574 (L-6) of the 112th AES Convention Munich, Germany, Audio Eng. Soc., May 2002.

Someone skilled in the art may—when applying the invention according the two embodiments—combine and consider these as general-purpose (HRTF) functions blocks with sound inputs and outputs. In other words, said embodiments may be applied to cascade couple sound signals. In other words, instead of $H_{PL}$ and HPR being output sound signals from one function block, they may—by cascading—be input to another function block.

Generally said formulas throughout the application may be implemented in a media system, such as a TV, a CD player, a DVD player, a Radio, a display, an amplifier or a VCR. This is shown by means of reference numeral 20 of FIG. 2. However, it may alternatively or additionally be the case that said formulas are integrated into a circuitry (or software) suitable for the purpose embedded in headphones with sufficient processing power.

Transmission between channels, (input sound signals) CH's and M to other intermediate sound channels and to resulting (output) sound signals or channels are drawn in the figures by lines with arrows. These lines may indicate that transmission may take place by means of circuitry suitable for enabling the communication of sound data, e.g., via a wired or a wireless data link. Examples of such transmission may be various transmitters, e.g., a transmitter including a network interface, a network card, a radio transmitter, a transmitter for other suitable electromagnetic signals, such as an LED for transmitting infrared light, e.g., via an IrDa port, radio-based communications, e.g., via a Bluetooth transceiver, or the like. Further examples of suitable transmitters include a cable modem, a telephone modem, an Integrated Services Digital Network (ISDN) adapter, a Digital Subscriber Line (DSL) adapter, a satellite transceiver, an Ethernet adapter, or the like. Correspondingly, a communications channel may be any suitable wired or wireless data link, for example, of a packet-based communications network, such as the Internet or another TCP/IP network, a short-range communications link, such as an infrared link, a Bluetooth connection or another radio-based link.

Further examples of the communications channel include computer networks and wireless telecommunications networks, such as a Cellular Digital Packet Data (CDPD) network, a Global System for Mobile (GSM) network, a Code Division Multiple Access (CDMA) network, a Time Division Multiple Access Network (TDMA), a General Packet Radio service (GPRS) network, a Third Generation network, such as a UMTS network, or the like.

Figure 3:
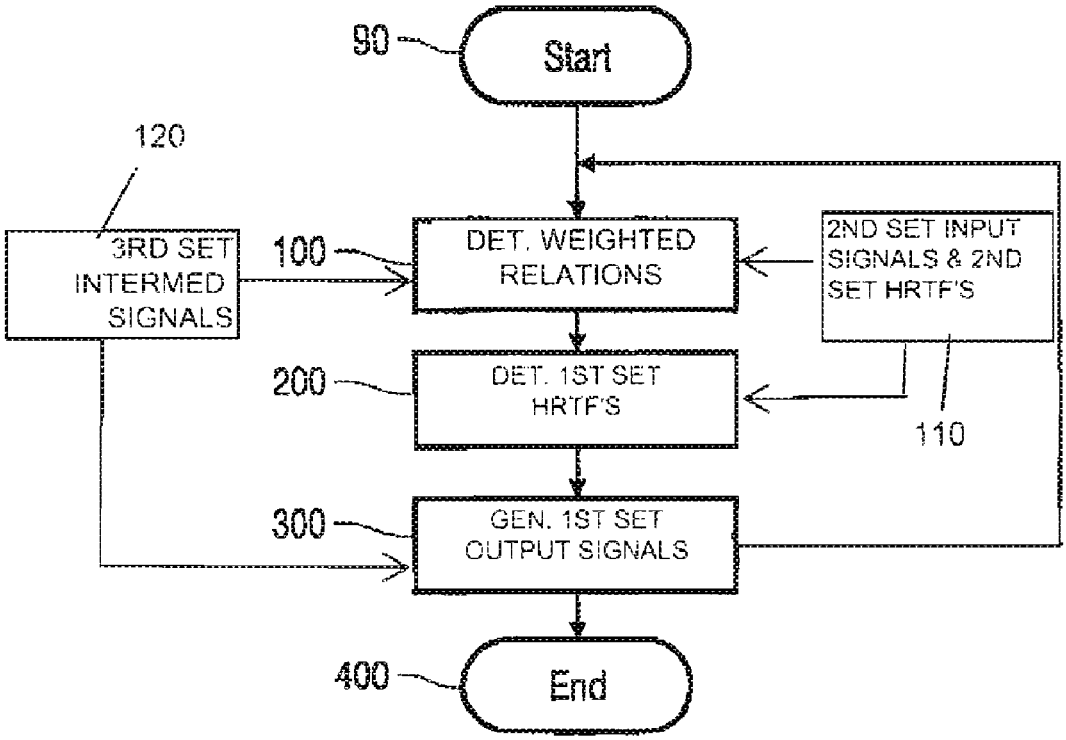
FIG. 3 shows a method of generating at least one output sound signal from at least one input sound signal belonging to a second set of input sound signals having a related second set of Head Related Transfer Functions.

FIG. 3 shows a method of generating at least one output sound signal from at least one input signal belonging to a second set of input sound signals having a related second set of Head Related Transfer Functions. This generation may take place in a media system, such as a TV, a CD player, a DVD player, a Radio, a display, an amplifier, a headphone and in a VCR.

In a typical application of the method (or embedded in an apparatus such as said media system), said output sound signal may belong to a first set of output sound signals, e.g., one or more outputs such as $H_{PL}$ or $H_{PR}$ directed to headphones or other speakers. Conversely, said second set of sound signals may be inputs such as $CH_1, CH_2 \ldots CH_n$ and M. However, said (input) sound signals may—in a sound signal cascade chain with function blocks of HRTF—be considered as general purpose sound signals as inputs or outputs depending on whether they enter (as input) or leave (as output) a block of cascade coupled sound signals. In other words, output sound signals from one function block may be input (sound signals) to another function block and vice versa.

Said second set of Head Related Transfer Functions (related to said input sound signals) may—from the discussed embodiments—comprise Head Related Transfer Functions (such as HRTF_L,l, HRTF_R,l, HRTF_L,r, HRTF_R,r, $HRTF_{1,L}$, $HRTF_{2,L}$, $HRTF_{3,L}$, . . . $HRTF_{1,R}$, $HRTF_{2,R}$, . . . etc.) initially dedicated to transform or transfer said second set of input sound signals.

In step 90, the method in accordance with preferred embodiments of the invention is started. Variables, flags, buffers, etc., keeping track of HRTFs, input and intermediate sound channels, output sound channels, weights, etc., corresponding to the sound signals processed are set to default values. When the method is started a second time, only corrupted variables, flags, buffers, etc, are reset to default values.

In step 100—continuing the method description—for each signal in the second set of (input) sound signals (110), a weighted relation may be determined. Said weighted relation may comprise at least one signal from a third set of intermediate sound signals (120), such as L and R; $CHI_1$ and $CHI_2$, respectively, (according to the two embodiments discussed) with corresponding weight values.

As discussed in the embodiments of the invention, one example—as the first embodiment—may be $CH_i$ (i.e., each of the i input sound signals)$=\alpha_i\cdot L+\beta_i\cdot R$, wherein $\alpha_i$, and $\beta_i$ are weight values, and L and R each is a signal belonging to said third set of the intermediate sound signals.

In the first embodiment, more input sound signals than (generated) output sound signals are processed by means of fewer HRTFs as compared to the prior art.

As further discussed in the embodiments of the invention, another example—as the second embodiment—may be $CHI_1=\alpha i_1\cdot M$ and $CHI_2=\alpha i_2\cdot M$, wherein $\alpha i_1$ and $\alpha i_2$ each is the weight value, and where $CHI_1$ and $CHI_2$ are the corresponding intermediate sound signals for this second embodiment.

In the second embodiment—as opposed to the first embodiment—fewer input sound signals, generally (in the example one) than generated output sound signals (in the example two) are processed by means of fewer HRTFs as compared to the prior art.

In step 200, a first (newly generated) set of Head Related Transfer Functions may be determined. Said first set (of Head Related Transfer Functions) may be based on the second set of sound signals (110), i.e., the input sound signals, the second set of Head Related Transfer Functions (110) (as discussed and used in the prior art) and the newly determined weighted relation(s). In other words, said first new set of Head Related Transfer Functions are generated for the purpose of a subsequent transformation of the intermediate sound signal(s) by means of it in the next step. The determination takes into account the second set of sound signals, i.e., inputs such as sound signals (typical as inputs) such as $CH_1$, $CH_2$ . . . $CH_n$ and M, and said second set of Head Related Transfer Functions initially dedicated to transform or transfer said second set of input sound signals. Further, the determination takes said weighted relation ($CH_i=\alpha_i \cdot L+\beta_i \cdot R$, etc.) with corresponding intermediate signals (L, R, etc.) into account corresponding to the formulas used to explain the invention's two embodiments.

In step 300, at least one signal belonging to said third set of intermediate sound signals (L, R, $CHI_1$, $CHI_2$) may be transferred by means of at least one HRTF belonging to said first set (of newly generated Head Related Transfer Functions) in order to generate at least one signal (as an output signal) belonging to said first set of output sound signals ($H_{PL}$, $H_{PR}$). At this point, newly generated HRTFs, i.e., said first set of Head Related Transfer Functions ($\cdot(\alpha_i \cdot$HRTFi,R), $\cdot(\beta_i \cdot$HRTFi,R), H__1, H__2, etc.) may be used to, actually to transfer and transform (convolve) one or more intermediate sound signals, such as L, R, (first embodiment) or $CHI_1$ and $CHI_2$ (second embodiment). As a result, at least one of the output sound signals $H_{PL}$, $H_{PR}$ is then generated.

It is hereby an advantage by the invention that said generation will—as previously discussed in the embodiments—generally be performed by fewer HRTFs and convolutions than the prior art.

Usually, the method will start all over again as long as the media system is powered. Otherwise, the method may terminate in step 400; however, when the media system is powered again, etc, the method may proceed from step 100.

A computer readable medium may be magnetic tape, optical disc, digital versatile disk (DVD), compact disc (CD record-able or CD write-able), mini-disc, hard disk, floppy disk, smart card, PCMCIA card, etc.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of generating, in a media system, at least one output signal belonging to a first set of sound signals from at least one input signal belonging to a second set of sound signals having a related second set of Head Related Transfer Functions, said method comprising the steps of determining, for each signal in the second set of sound signals, a weighted relation comprising at least one signal belonging to a third set of intermediate sound signals and at least one weight value; determining a first set of Head Related Transfer Functions based on the second set of sound signals, the second set of Head Related Transfer Functions and the weighted relation; and transferring at least one signal from the third set of intermediate sound signals by means of at least one HRTF from said first set of Head Related Transfer Functions to generate at least one output signal belonging to said first set of sound signals.

2. A method according to claim 1, characterized in the step of determining for each signal, i in the second set of sound signals determines $CH_i=\alpha_i \cdot L+\beta_i \cdot R$, wherein $\alpha_i$, and $\beta_i$ each is the weight value, and wherein L and R each is a signal from said third set of intermediate sound signals.

3. A method according to claim 1, characterized in the step of determining for each signal determines $CHI_1=\alpha i_1 \cdot M$ and $CHI_2=\alpha i_2 \cdot M$, wherein $\alpha i_1$ and $\alpha i_2$ each is the weight value, and wherein M is a signal belonging to said third set of intermediate sound signals.

4. A method according to claim 1, characterized in that the media system is a TV, a CD player, a DVD player, a Radio, a display, an amplifier, a headphone or a VCR.

5. A *non-transitory computer-readable medium encoded with a* computer program [product] comprising program code [means stored on a computer readable medium for performing] *for causing a computer, when loaded with and running the computer program, to perform* the method of claim 1 [when the computer program is run on a computer].

6. A media system for generating at least one output signal belonging to a first set of sound signals from at least one input signal belonging to a second set of sound signals having a related second set of Head Related Transfer Functions, said media system comprising: means for determining, for each signal in the second set of sound signals, a weighted relation comprising at least one signal belonging to a third set of intermediate sound signals and at least one weight value; means for determining a first set of Head Related Transfer Functions based on the second set of sound signals, the second set of Head Related Transfer Functions and the weighted relation; and means for transferring at least one signal from the third set of intermediate sound signals by means of at least one HRTF from said first set of Head Related Transfer Functions to generate at least one output signal belonging to said first set of sound signals.

*7. A method of generating, in a media system, at least one output signal belonging to a first set of sound signals from at least one input signal belonging to a second set of sound signals having a related second set of Head Related Transfer Functions, said method comprising the steps of*

*determining, for each signal in the second set of sound signals, a weighted relation comprising at least one signal belonging to a third set of intermediate sound signals and at least one weight value;*

*determining a first set of Head Related Transfer Functions based on the second set of Head Related Transfer Functions and the weighted relation; and*

*transferring at least one signal from the third set of intermediate sound signals by means of at least one HRTF from said first set of Head Related Transfer Functions to generate at least one output signal belonging to said first set of sound signals.*

*8. A method according to claim 7, characterized in the step of determining for each signal, i in the second set of sound*

*signals determines* $CH_i=\alpha_i \cdot L+\beta_i \cdot R$, *wherein* $\alpha_i$, *and* $\beta_i$ *each is the weight value, and wherein L and R each is a signal belonging to said third set of intermediate sound signals.*

*9. A method according to claim 7, characterized in the step of determining for each signal determines* $CHI_1=\alpha i_1 \cdot M$ *and* $CHI_2=\alpha i_2 \cdot M$, *wherein* $\alpha i_1$ *and* $\alpha i_2$ *each is the weight value, and wherein M is a signal belonging to said third set of intermediate sound signals.*

*10. A method according to claim 7, characterized in that the media system is a TV, a CD player, a DVD player, a Radio, a display, an amplifier, a headphone or a VCR.*

*11. A non-transitory computer-readable medium encoded with a computer program comprising program code for causing a computer, when loaded with and running the computer program, to perform the method of claim 7.*

*12. A media system for generating at least one output signal belonging to a first set of sound signals from at least one input signal belonging to a second set of sound signals having a related second set of Head Related Transfer Functions, said media system comprising:*

*means for determining, for each signal in the second set of sound signals, a weighted relation comprising at least one signal belonging to a third set of intermediate sound signals and at least one weight valve;*

*means for determining a first set of Head Related Transfer Functions based on the second set of Head Related Transfer Functions and the weighted relation; and*

*means for transferring at least one signal from the third set of intermediate sound signals by means of at least one HRTF from said first set of Head Related Transfer Functions to generate at least one output signal belonging to said first set of sound signals.*

* * * * *